United States Patent
Reddy

(12) 
(10) Patent No.: US 10,917,365 B1
(45) Date of Patent: Feb. 9, 2021

(54) MESSAGING PLATFORM AND METHOD OF AUDITABLE TRANSMISSION OF MESSAGES

(71) Applicant: Tanla Digital Labs Private Limited, Telangana (IN)

(72) Inventor: Dasari Uday Kumar Reddy, Telangana (IN)

(73) Assignee: Tania Digital Labs Private Limited, Telangana (IN)

(*) Notice: Subject to any disclaimer, the term of this patent is extended or adjusted under 35 U.S.C. 154(b) by 0 days.

(21) Appl. No.: 16/780,110

(22) Filed: Feb. 3, 2020

(51) Int. Cl.
*H04L 12/58* (2006.01)
*G06Q 40/00* (2012.01)

(52) U.S. Cl.
CPC ............ *H04L 51/02* (2013.01); *G06Q 40/12* (2013.12); *H04L 51/34* (2013.01)

(58) Field of Classification Search
CPC .......... H04L 51/02; H04L 51/34; G06Q 40/12
See application file for complete search history.

(56) References Cited

U.S. PATENT DOCUMENTS

| 7,027,773 | B1* | 4/2006 | McMillan | H04L 45/00 455/41.2 |
| 10,122,661 | B2 | 11/2018 | Golan | |
| 2017/0132626 | A1* | 5/2017 | Kennedy | G06Q 20/065 |
| 2017/0171117 | A1* | 6/2017 | Carr | H04L 51/16 |
| 2019/0116142 | A1 | 4/2019 | Chalakudi et al. | |
| 2019/0238486 | A1 | 8/2019 | Zizka | |
| 2019/0297471 | A1* | 9/2019 | Baer | H04W 68/00 |

FOREIGN PATENT DOCUMENTS

WO   WO2019206889 A1   10/2019

OTHER PUBLICATIONS

Vanleeuwen et al., Blockchain—Operator Opportunities, GSMA, Version 1.0, Jul. 2018, www.gsma.com, p. 1-36.

* cited by examiner

*Primary Examiner* — S M A Rahman
(74) *Attorney, Agent, or Firm* — Bret E. Field; Bozicevic, Field & Francis LLP

(57) ABSTRACT

The present disclosure relates to a messaging platform and a method of enabling auditable transmission of messages from a sender application server to a recipient application server for delivery to end users. The messaging platform comprises a distributed ledger and at least a communication unit coupled with the distributed ledger. The sender application server comprises a first communication node hosted therein to transmit messages to the communication unit as a part of first transaction and record the first transaction on the distributed ledger. The communication unit retrieves and pushes the messages to the second communication node as a part of second transaction and record the transaction on the distributed ledger. The second communication node hosted at the recipient application server, retrieve the messages as a part of third transaction and record the third transaction in the distributed ledger, thereby enabling traceability and transparency of the message flow during the message transmission.

20 Claims, 10 Drawing Sheets

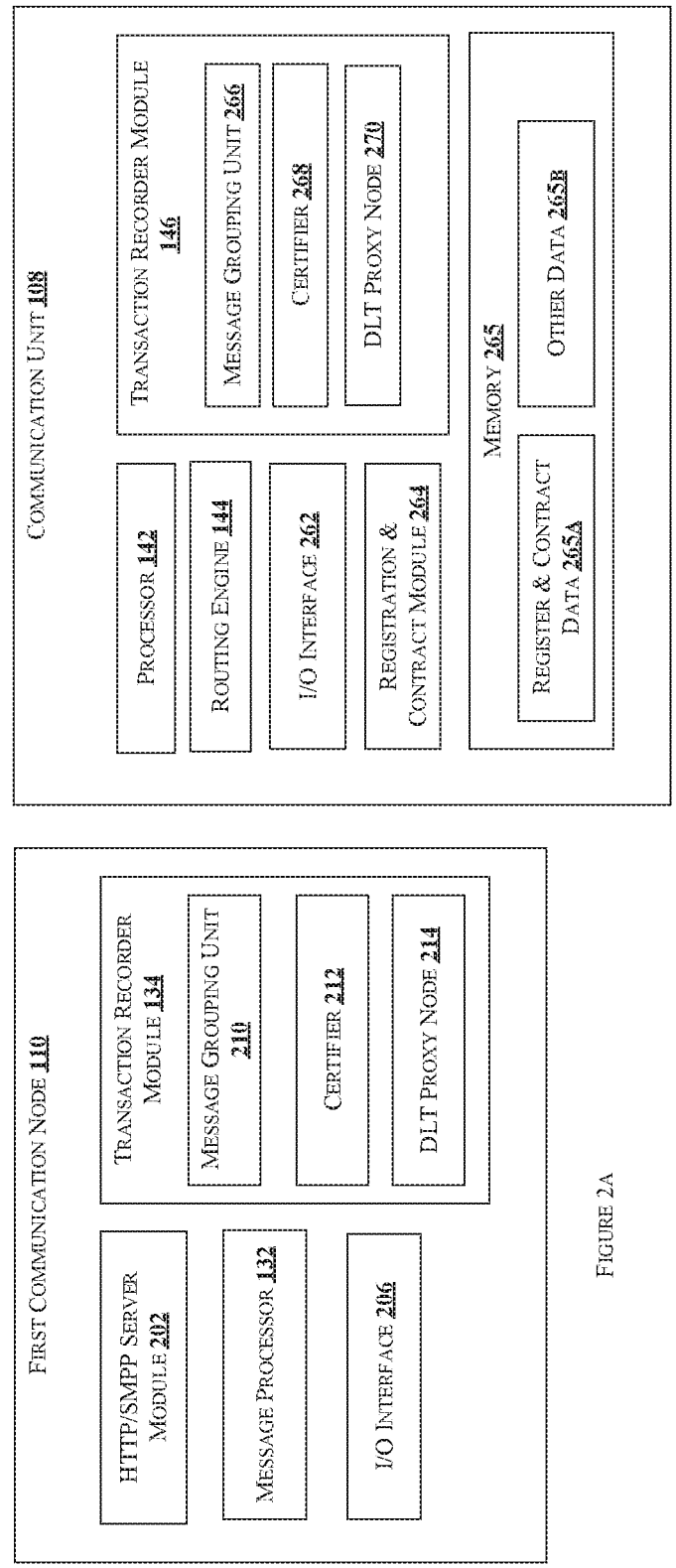

MESSAGING PLATFORM AND METHOD OF AUDITABLE TRANSMISSION OF MESSAGES

TECHNICAL FIELD OF THE DISCLOSURE

The present disclosure generally relates to messaging platforms, and more particularly, but not exclusively to a messaging platform and a method of auditable transmission of messages.

BACKGROUND

Traditionally, commercial communication such as Application-to-Person (A2P) and Person-to-Application (P2A) messaging exists to enable enterprises to send messages to users and vice versa. Application-to-Person (A2P) messaging is one-way message in which recipients are not expected to reply. Enterprise applications use an Application Program Interface (API) to send and receive text messages. Some examples of the A2P messaging includes, but are not limited to, mobile marketing messages, appoint reminders, alerts & notifications, voting & survey, and two-factor authentication messages such as one-time passwords (OTPs) and etc. P2A messaging is the process of sending messages from end user devices to an enterprise application, commonly referred to as Mobile Originated (MO) messages. Some examples of the P2A messaging includes, but are not limited to, entertainment voting campaigns, competitions, lottery campaigns, subscriptions and so on.

Current ecosystem of the A2P and P2A messaging environment includes at least third parties, tele-marketers, gateway providers and resellers before the message sent from the enterprises reaches the telecom operators and end-users. In such a scenario, the enterprises are unable to trace the message flow between the third parties and/or sub-third parties till the telecom operators, thereby leading to lack of traceability and/or transparency or visibility of message flow, leading to reduced throughput of message delivery. Further, the enterprises are unable to ensure the integrity of message Call Data Record (CDRs) provided by the intermediate third parties as there is no audit on the number of messages delivered to the end users. In another scenario, the CDRs may be manipulated by intermediate third parties generating fake delivery receipts in the absence of receiving genuine delivery receipts, thereby generating revenue loss and reduced customer reach to the enterprises. Furthermore, the third parties use different routes for delivering messages to the telecom operators, deviating from the standard routes to be followed for message routing and transmission, thereby adding more cost to the enterprises for the usage of other expensive routes, hence incurring revenue loss to the enterprises. In addition, the third parties may also generate fake CDRs to camouflage that the messages have been routed and delivered through approved routes to the end users, thereby leading to lack of transparency for the enterprises about the route followed to deliver messages, and increase in cost due to usage of expensive unauthorized routes for message delivery.

Further, there could be delay in delivering messages to the end users due to delay caused by the third parties to forward the messages to the assigned telecom operators, thus, leading to lack of transparency and traceability of the message flow and delay caused therein. Furthermore, the third parties may kill the messages before forwarding to the assigned telecom operators, thereby the messages are unavailable to the end users and non-traceable by the enterprise server that sent the messages. Moreover, in other scenarios, traceable delivery of messages is desirable for messages that contain critical and confidential information for immediate use by the end users. Hence, delay in delivery of such messages would lead to undesirable customer experience, and loss of trust with the telecom operators.

Accordingly, there is required an ability to provide a method and system for immutable, traceable, transparent messaging systems for A2P and/or P2A messages, so that the messages are traceable by all entities at any point of time during the transmission.

SUMMARY

One or more shortcomings of the prior art are overcome, and additional advantages are provided through the present disclosure. Additional features and advantages are realized through the techniques of the present disclosure. Other embodiments and aspects of the disclosure are described in detail herein and are considered a part of the claimed disclosure.

In an embodiment, the present disclosure relates to a messaging platform for auditable transmission of a plurality of messages from at least a sender application server to at least a recipient application server. The messaging platform comprises a distributed ledger, and at least a first communication node hosted at the sender application server. The first communication node is configured to receive the plurality of messages from the sender application server as a part of first transaction and record the first transaction on the distributed ledger. The messaging platform comprises at least a communication unit coupled with the first communication node and configured to push the plurality of messages to at least a second communication node as a part of second transaction and record the second transaction on the distributed ledger. The at least one second communication node coupled with the communication unit and hosted at the recipient application server is configured to transmit the plurality of messages to the recipient application server as a part of third transaction and record the third transaction on the distributed ledger.

In another embodiment, the present disclosure relates to a method of auditable transmission of a plurality of messages from at least a sender application server to at least a recipient application server. The method comprising steps of receiving a plurality of messages from the sender application server as a part of first transaction and recording the first transaction on a distributed ledger. The method further comprises step of pushing the received plurality of messages onto the recipient application server as a part of second transaction and recording the second transaction on the distributed ledger. Furthermore, the method comprises transmitting the plurality of messages to the recipient application server as a part of third transaction and recording the third transaction on the distributed ledger.

In yet another embodiment, the present disclosure relates to an article of manufacture including a non-transitory, tangible computer readable storage medium having instructions stored thereon, that in response to execution by a messaging platform, cause the messaging platform to perform one or more operations. The operations comprise receiving a plurality of messages from the sender application server as a part of first transaction and recording the first transaction on a distributed ledger. The operations further comprise step of pushing the received plurality of messages onto the recipient application server as a part of second transaction and recording the second transaction on the distributed ledger. Furthermore, the operations comprise transmitting the plurality of messages to the recipient application server as a part of third transaction and recording the third transaction on the distributed ledger.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed embodiments. In the figures, the leftmost digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which:

FIGS. 2a, 2b and 2c are a simplified schematic diagrams respectively illustrating an exemplary block diagram of a first communication node, a second communication node and a communication unit of FIGS. 1a and 1b in accordance with some embodiments of the present disclosure;

Figure 1A:
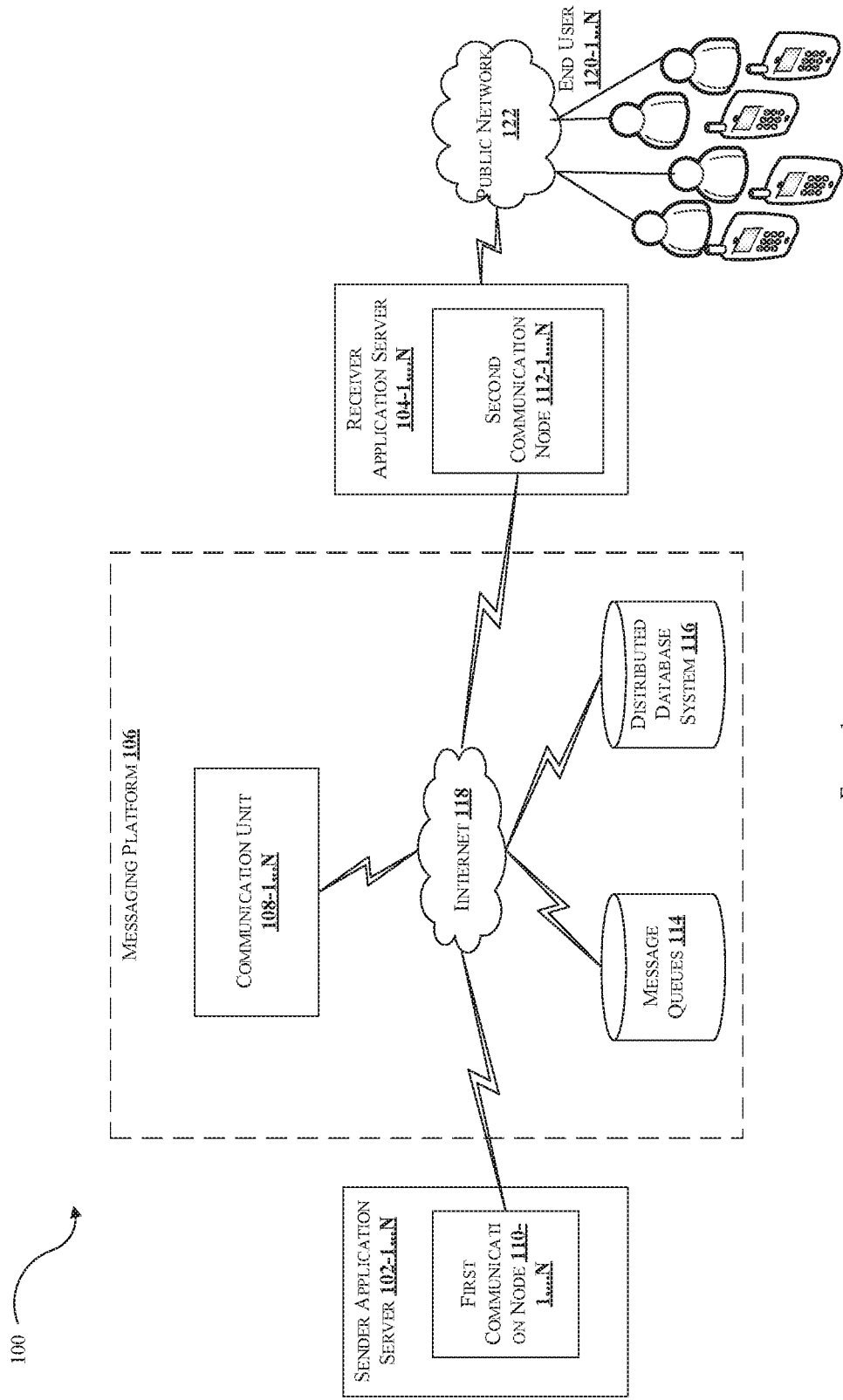
FIG. 1a is a simplified architecture diagram of a system for enabling auditable transmission of messages from a sender application server to a recipient application server for delivery to end users in accordance with some embodiments of the present disclosure.

It should be appreciated by those skilled in the art that any block diagrams herein represent conceptual views of illustrative systems embodying the principles of the present subject matter.

DETAILED DESCRIPTION OF EXAMPLE EMBODIMENTS

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or apparatus.

The present disclosure relates to a messaging platform and a method of enabling auditable transmission of messages from a sender application server to a recipient application server for delivery to end users and vice versa. The messaging platform comprises a distributed ledger, at least a first communication node hosted at the sender application server and at least a second communication node hosted at the recipient application server. The first communication node receives a request for message transmission from the sender application server as a part of first transaction and record the first transaction on the distributed ledger.

The messaging platform also comprises at least one communication unit communicatively coupled with the first and the second communication node and configured to receive the messages from the first communication node and push the messages to the second communication node as a part of second transaction and record the transaction on the distributed ledger. The second communication node hosted at the recipient application server pulls the messages as a part of third transaction and record the third transaction in the distributed ledger. The messaging platform transmits messages and record the transaction for every message, for example, Application-to-Person (A2P) message and Call Data Record (CDR) received in response to delivery of A2P message to the end users, so as to provide traceability and transparency of the message flow during the transmission from the sender application server till the recipient application server.

Further, the messaging platform also enables recording of transaction related to CDR messages generated by the recipient application server, thereby preventing generation of fake CDRs by any of the third or intermediate parties for the enterprises. Furthermore, as every recorded transaction is stored in the distributed database system, such as blockchain or distributed ledgers that are immutable, the messaging platform also avoids manipulation of CDRs and timestamp and/or route information by third parties, thereby enabling transparency and visibility to the sender application server on the messages delivered, route followed, time stamp and CDRs received. As the messaging platform do not involve any third parties for message delivery, the delay caused by the transmission of messages by third parties is also avoided, thereby improving the throughput of the message transmission and increased customer reach.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

Example Embodiments

FIG. 1a is a simplified architecture diagram of a system for enabling auditable transmission of messages from a sender application server to recipient application server for delivery to end users in accordance with some embodiments of the present disclosure.

As shown in FIG. 1a, system 100 includes components including one or more sender application servers 102-1, 102-2, . . . 102-N (hereinafter collectively referred to as sender server 102), one or more recipient application server 104-1, 104-2, . . . 104-N (hereinafter collectively referred to as recipient server 104), and a messaging platform 106 enabling message transmission between the sender server 102 and the recipient server 104. In one embodiment, the messaging platform 106 comprises one or more communication unit 108-1, 108-2, . . . 108-N (hereinafter collectively referred to as communication unit 108) capable of storing transactions for aggregating and transmitting messages from the sender server 102 to the recipient server 104. The sender server 102 comprises at least a first communication node 110-1, 110-2, . . . 110-N (hereinafter collectively referred to as first node 110) hosted either on-premise or on a subscription basis at the sender server 102, and capable of pushing messages to the messaging platform 106 from the sender server 102. The recipient server 104 comprises at least a second communication node 112-1, 112-2, . . . 112-N (hereinafter collectively referred to as second node 112) hosted either on-premise or on a subscription basis at the recipient server 104, and capable of pulling messages from the messaging platform 106 for delivery to end users. The messaging platform 106 is also capable of storing respective transaction IDs for recording on a distributed database system 116 such as distributed ledger or blockchain layer. In one example embodiment, the distributed database system 116 may be a private blockchain layer. The messaging platform 106 further comprises one or more message queues 114 for receiving messages during the push operation by the first node 110 and for transmitting messages during the pull operation by the second node 112. The sender server 102, the messaging platform 106 and the recipient server 104 are communicatively coupled with each other via a network such as Internet 118. The communication unit 108 receives a plurality of messages from the first node 110 and pushes the received plurality of messages to the second node 112 via the Internet 118. The recipient server 104 further forwards the plurality of messages to end users 120 via public network 122.

The public network 122 may be for example, analog or digital wired and wireless telephone networks, e.g., public switched telephone networks (PSTN), integrated services digital networks (ISDN), various types of digital subscriber lines, advanced mobile telephone service (AMPS), global system for mobile communication (GSM), code division multiple access (CDMA), radio, cable, satellite and/or delivery mechanisms for carrying voice or non-voice data.

Figure 1B:
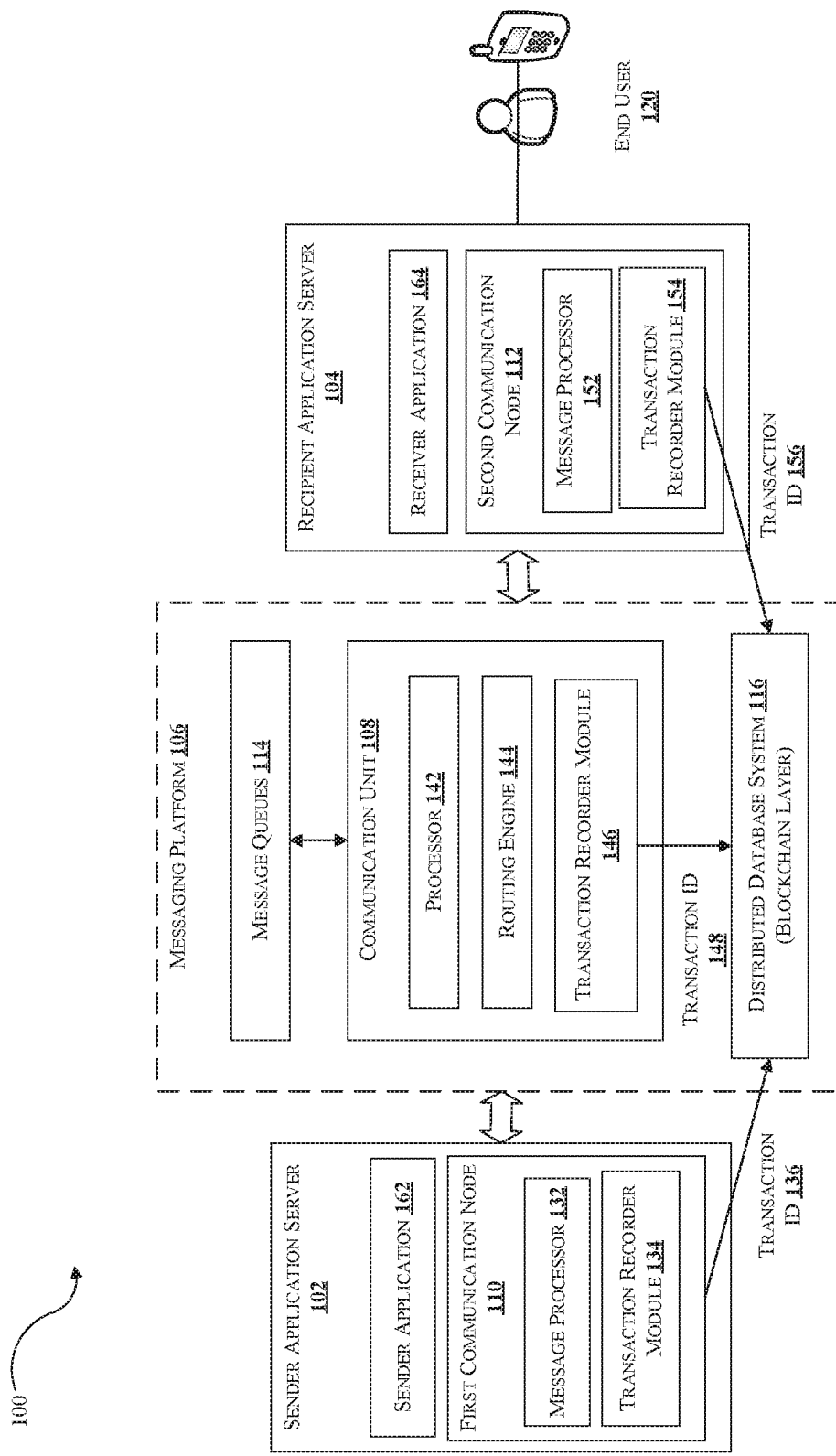
FIG. 1b is a detailed schematic diagram of the messaging platform of FIG. 1a in accordance with some embodiments of the present disclosure.

As illustrated in FIG. 1b, the sender server 102 comprises one or more sender applications 162 configured to generate the plurality of messages for transmission to the end users 120 via the messaging platform 106. The sender server 102 comprises the first node 110 comprising at least a message processor 132, and a transaction recorder module 134 to transmit the plurality of messages to the communication unit 108 as first transaction and record the first transaction of transaction ID 136 on the distributed database system (DDS) 116. In one example, the DDS 116 comprises a sender server peer node for recording the first transaction. The communication unit 108 comprises at least a processor 142, a routing engine 144, and a transaction recorder module 146 to push the plurality of messages from the first node 110 to the second node 112 as second transaction and record the second transaction of transaction ID 146 on the DDS 116. In one example, the DDS 116 comprises a communication unit peer node for recording the second transaction. The recipient server 104 comprises the second node 112 comprising at least a message processor 152 and a transaction recorder module 154 to forward the plurality of messages to the recipient server 104 as third transaction and record the third transaction of transaction ID 156 on the DDS 116. In one example, the DDS 116 comprises a recipient server peer node for recording the third transaction. The recipient server 104 also comprises one or more receiver applications 164 to receive the plurality of messages from the second node 112 for delivery to end users 120-1.

In operation, the first node 110 hosted in the sender server 102 receives the plurality of messages from the sender applications 162. In some other embodiment, the first node 110 is hosted in a centralized cloud enabled platform or used on subscription basis. The first node 110 comprises at least the message processor 132, and the transaction recorder module 134 coupled to the message processor 132. FIG. 2a best illustrates an exemplary block diagram of the first node 110. As illustrated, the first node 110 comprises at least the message processor 132, the transaction recorder module 134, a HTTP/SMPP server module 202, and a I/O interface 206. As used herein, the term module refers to an application specific integrated circuit (ASIC), an electronic circuit, a processor (shared, dedicate, or group) and memory that execute one or more software or firmware programs, a combination logic circuit, and/or other suitable components that provide the described functionalities of the first node 110.

The I/O interface 206 is configured to receive the plurality of messages from the sender server 102 and further transmit to the communication unit 108. The HTTP/SMPP server module 202 receives the plurality of messages via the I/O interface 206 in one of Hyper Text Transfer Protocol (HTTP) and Short Message Peer to Peer (SMPP) protocol. The message processor 132 processes the plurality of messages received in one of the HTTP and SMPP protocol to a suitable format for further transmission to the communication unit 108. The message processor 132 further queues the plurality of messages in the message queues 114 as part of the first transaction and enables the transaction recorder module 134 to write the transaction on the distributed ledger. The transaction recorder module 134 comprises at least a message grouping unit 210, a certifier 212 and a DLT proxy node 214. The message grouping unit 210 is configured to aggregate the plurality of messages received for a predetermined time period based on predefined criteria so as to generate a set of aggregated messages. In one example, the predefined criteria include one or more of sender application server account ID, sender application server subaccount ID, aggregation time period, and count of messages. The certifier 212 verifies the set of aggregated messages and signs the first transaction for recording on the distributed ledger. The DLT proxy node 214 enables the recording of the first transaction on the DDS 116. In one embodiment, the DDS 116 comprises an ordering service module 230 configured to execute the recording of the first transaction by the sender server peer node 232 as illustrated in FIG. 2d. The sender server peer node 232 is configured to write a first transaction data on the distributed ledger 232-1. In one example, the first transaction data comprises at least sender application server account ID, the sender application server subaccount ID, aggregation start time, aggregation end time, hash of message hash values, count of messages, and a plurality of transaction IDs of the aggregated messages and respective time stamp of the plurality of transaction IDs.

The communication unit 108 receives the plurality of messages queued by the first node 110 and pushes the messages from the message queues 114 to the second node 112 for further transmission to the recipient server 104 and end users 120. In some embodiments, the communication unit 108 comprises at least a processor 142, a routing engine 144, and a transaction recorder module 146 coupled to the processor 142.

FIG. 2b best illustrates an exemplary block diagram of the communication unit 108. The communication unit 108 may be configured to host any cloud computing service that allows auditable transmission of messages using for example, distributed ledger technology (DLT) or blockchain. As illustrated, the communication unit 108 comprises the processor 142, the routing engine 144, an I/O interface 262, and one or more modules such as a registration & contract (RC) module 264 and the transaction recorder module 146 to perform various operations in accordance with some embodiments of the present disclosure. As used herein, the term module refers to an application specific integrated circuit (ASIC), an electronic circuit, a processor (shared, dedicate, or group) and memory that execute one or more software or firmware programs, a combination logic circuit, and/or other suitable components that provide the described functionalities of the communication unit 108. Further, in an embodiment, the data may be stored within the memory 265 and may include, without limiting to, register & contract data 265a and other data 265b.

The I/O interface 262 retrieves the plurality of messages from the message queues 114 pushed by the first node 110. The routing engine 144 determines at least one second node 112 for routing the plurality of messages based on predetermined routing logic and predefined set criteria. In one example embodiment, the routing logic may determine a path to the second node 112 that are registered with the sender server 102 for delivery to end users 120. The RC module 264 enables registration of the sender server 102, recipient server 104 with the messaging platform 106 and create contract between selected partners for transmission using the messaging platform 106. The RC module 264 also enables the sender server 102 and the recipient server 104 to subscribe to one or more services based on the requirements and store the registration and contract information as the register & contract data 265a. Upon determination of the second node 104 by the routing engine 144, the processor 142 pushes the plurality of messages from first message queue to a second message queue of the message queues 114 as part of second transaction so as to be retrieved by the second node 104. The transaction recorder module 146 records the second transaction including the transaction ID 148 on the distributed ledger of the distributed database system 116. In alternative embodiments, the processor 142 also stores the transaction ID 148 in the memory 265 as the other data 265b.

In one embodiment, the transaction recorder module 146 comprises at least a message grouping unit 266, a certifier 268 and DLT proxy node 270 coupled to the processor 142. The message grouping unit 266 is configured to aggregate the plurality of messages received for a predetermined time period based on predefined criteria so as to generate a set of aggregated messages. In one example, the predefined criteria include one or more of sender application server account ID, sender application server subaccount ID, aggregation time period, count of messages, sender aggregator ID and sender sub-aggregator ID. The certifier 268 verifies the set of aggregated messages and signs the second transaction for recording on the distributed ledger. The DLT proxy node 270 enables the recording of the second transaction on the DDS 116. In one embodiment, the ordering service module 230 is configured to execute the recording of the second transaction by the communication unit peer node 272 as illustrated in FIG. 2d. The communication unit peer node 272 is configured to write a second transaction data on the distributed ledger 272-1. In one example, the second transaction data comprises at least sender application server account ID, the sender application server subaccount ID, aggregation start time, aggregation end time, hash of message hash values, count of messages, sender aggregator ID, recipient application server ID, and a plurality of transaction IDs of the aggregated messages and respective time stamp of the plurality of transaction IDs.

The second node 104 then retrieves the plurality of messages from the message queues 114 as pushed by the communication unit 108 and forwards to one or more receiver application 164 as a part of third transaction. In some embodiment, the second node 112 hosted in the recipient server 104 to receive the plurality of messages from the one or more receiver applications 164. In some other embodiment, the second node 112 is hosted in a centralized cloud enabled platform and used on subscription basis. The second node 112 comprises at least the message processor 152 and the transaction recorder module 154 coupled to the message processor 152.

Figure 2C:
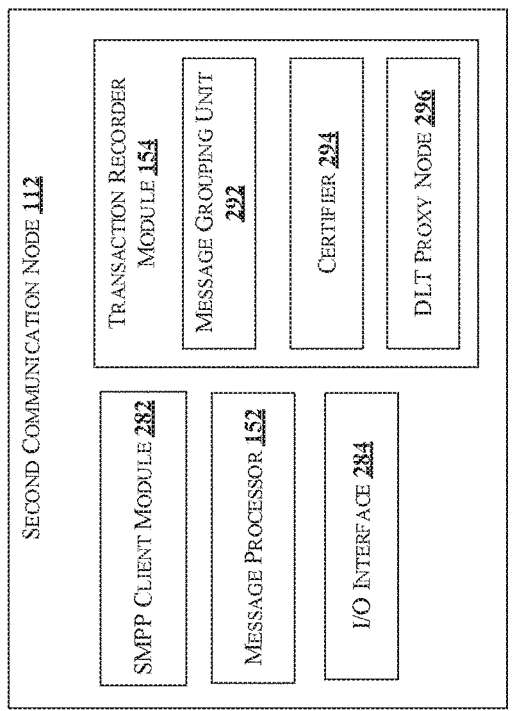
Figure 2D:
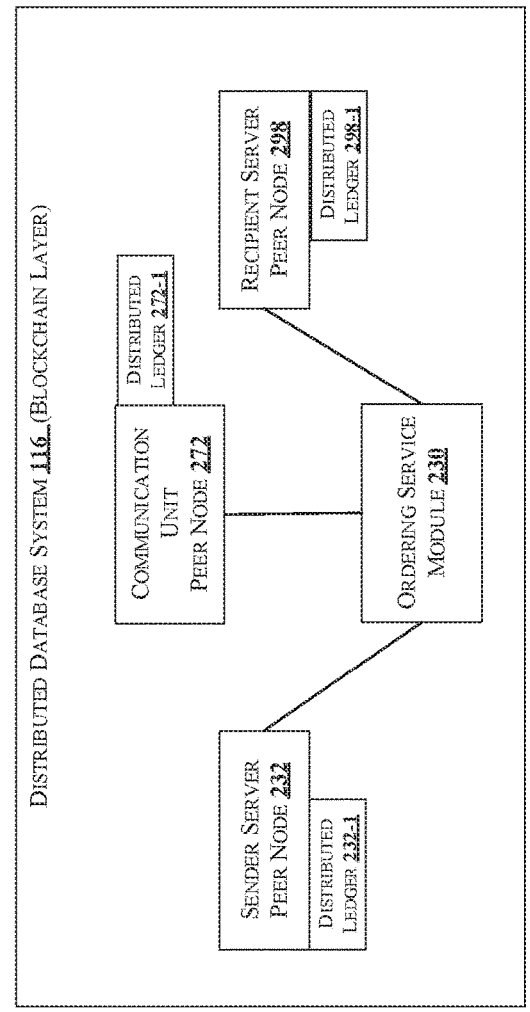
FIG. 2d is a simplified schematic diagram illustrating an exemplary block diagram of a distributed database system of FIGS. 1a and 1b in accordance with some embodiments of the present disclosure.

FIG. 2c best illustrates an exemplary block diagram of the second node 112. As illustrated, the second node 112 comprises the message processor 152, the transaction recorder module 154, a SMPP client module 282, and a I/O interface 284. The I/O interface 284 retrieves the plurality of messages from the message queues 114 of the communication unit 108. As used herein, the term module refers to an application specific integrated circuit (ASIC), an electronic circuit, a processor (shared, dedicate, or group) and memory that execute one or more software or firmware programs, a combination logic circuit, and/or other suitable components that provide the described functionalities of the second node 112.

The SMPP client module 282 receives the plurality of messages via the I/O interface 284. The message processor 152 processes the plurality of messages into suitable format for further transmission to the recipient server 104 as the third transaction. The transaction recorder module 154 comprises at least a message grouping unit 292, a certifier 294 and a DLT proxy node 296. The message grouping unit 292 is configured to aggregate the plurality of messages received for a predetermined time period based on predefined criteria so as to generate a set of aggregated messages. In one example, the predefined criteria include at least sender application server account ID, sender application server subaccount ID, aggregation time period, count of messages, sender aggregator ID, sender sub-aggregator ID and recipient application server ID. The certifier 294 verifies the set of aggregated messages and signs the third transaction for recording on the distributed ledger. The DLT proxy node 296 enables the recording of the third transaction on the DDS 116. In one embodiment, the ordering service module 230 is configured to execute the recording of the third transaction by the recipient server peer node 298 as illustrated in FIG. 2d. The recipient server peer node 298 is configured to write a third transaction data on the distributed ledger 298-1. In one example, the third transaction data comprises at least sender application server account ID, the sender application server subaccount ID, aggregation start time, aggregation end time, hash of message hash values, count of messages, sender aggregator ID, recipient application server ID, and a plurality of transaction IDs of the aggregated messages and respective time stamp of the plurality of transaction IDs. The receiver application 164 receives the plurality of messages from the second node 104 for delivery to end users 120.

In an example, the message may be an Application-to-Person (A2P) message that are transactional in nature comprising critical and confidential to end users. A2P message may also include service messages, promotional messages. A2P message may be transmitted as for example, Short Message Service (SMS), Rich Communication Service (RCS), Multimedia Messaging Service (MMS) and so on. In an embodiment, if an enterprise needs to transmit A2P messages comprising confidential to end users, the sender server 102 may be a typical enterprise server that originate the A2P message and forward to the recipient server 104 via the messaging platform 106. The messaging platform 106 also enables recording of the message forwarding transactions on the distributed ledger. The recipient server 104 may be a typical telecom operator or telecom server capable of forwarding the received A2P message to the end users 120 via the public network 122. In response to receipt of the A2P message by the end users 120, the telecom server generates Call Data Record (CDR) messages and forwards the CDR messages to the enterprise server 102 via the messaging platform 106. The messaging platform 106 also enables recording of the CDR message on the distributed ledger for enabling transparency of the CDR messages to the enterprise server.

In yet another example, the message may be a Person-to-Application (P2A) wherein end users generate and transmit a P2A message to the telecom server for transmission to the enterprise server. For example, the P2A message may be a message for casting vote for a reality entertainment show, message to know the current balance in an end user's bank account or so on. If the message is originated from the end user, the sender server 102 may be the telecom server that transmits the P2A message via the messaging platform 106. The messaging platform 106 pushes the P2A message to the recipient server 104 i.e., the enterprise server for further process.

Figure 3A:
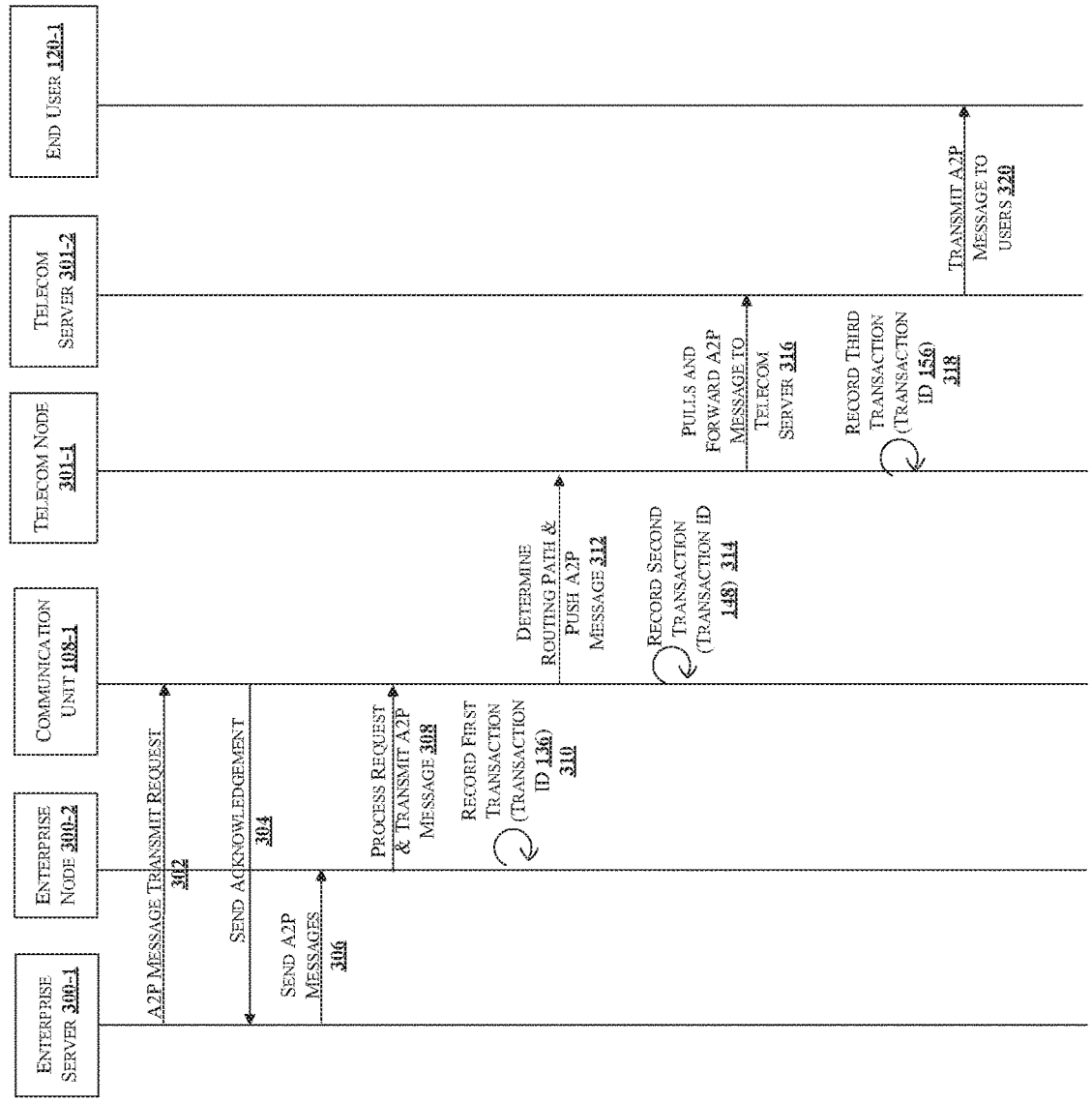
FIG. 3a is a simplified flow diagram of an embodiment of the messaging platform for Application-to-Person (A2P) messaging from an enterprise server to a telecom server in accordance with some embodiment of the present disclosure.

FIG. 3a best illustrates the flow diagram of A2P messaging from an enterprise server to end users via a telecom server using the messaging platform 106. As illustrated, the sender server 102 may be the enterprise server 300-1, the first node 110 may be the enterprise node 300-2 hosted at the enterprise server 300-1.

The enterprise server 300-1 initiates an A2P message request and transmits to the communication unit 108 over HTTP or SMPP protocol at step 302. In one embodiment, the enterprise application of the enterprise server 300-1 invoke one or more Application Programming Interface (API)s using one of HTTP and SMPP protocol to initiate the A2P message request. The enterprise server 300-1 receives an acknowledgement from the communication unit 108 for servicing the A2P message request at step 304. The enterprise server 300-1 transmits the A2P messages comprising message content along with the metadata to the enterprise node 300-2 at step 306. The message processor 132 of the first node 110-1 i.e., the enterprise node 300-2 receives and processes the received message content to a suitable format for transmission to the communication unit 108 at step 308. In one embodiment, the enterprise node 300-2 processes the message content into a suitable format and transmits the A2P message via HTTP protocol as a part of first transaction. In another embodiment, the enterprise node 300-2 may encrypt the A2P message before transmitting to the communication unit 108. Further, the enterprise node 300-2 writes the first transaction having the transaction ID 136 into the DDS 116 at step 310.

Figure 3B:
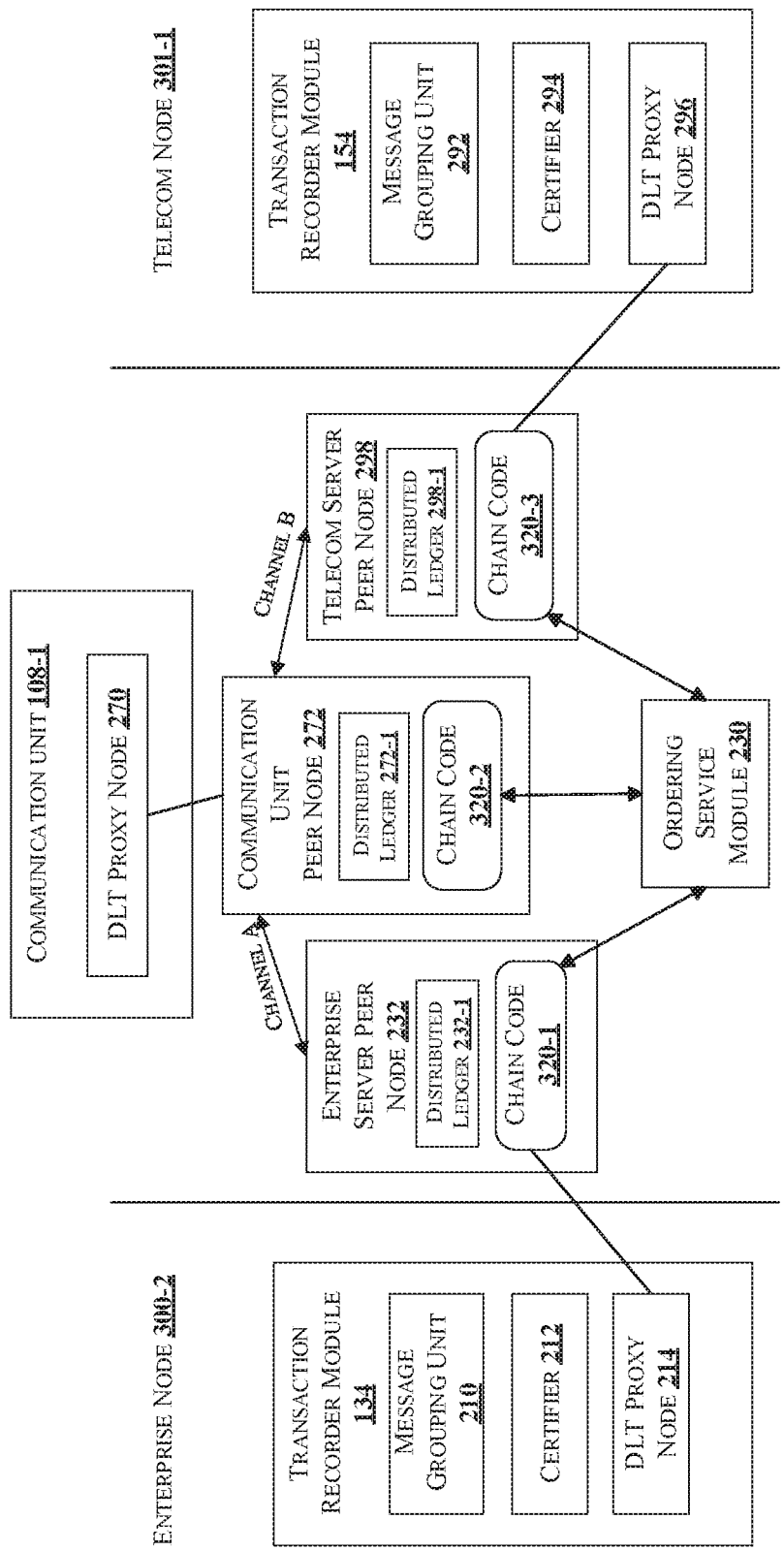
FIG. 3b is a simplified schematic diagram illustrating an exemplary functional diagram of the distributed database system referred in FIG. 3a in accordance with some embodiments of the present disclosure.

As illustrated in FIG. 3b, the transaction recorder module 134 of the enterprise node 300-2 writes the first transaction on the DDS 116. The message grouping unit 210 is configured to aggregate the A2P messages received for a predetermined time period based on predefined criteria so as to generate a set of aggregated A2P messages. In another embodiment, the message grouping unit 210 may aggregate the encrypted A2P messages before recording on the distributed ledger based on the predefined criteria. In one example, the predefined criteria include one or more of enterprise server account ID, enterprise subaccount ID, aggregation time period, and count of messages. The certifier 212 verifies the set of aggregated A2P messages and signs the first transaction for recording on the distributed ledger 232-1. The DLT proxy node 214 transmits a first transaction data to the ordering service module 230 for committing the first transaction on the distributed ledger 232-1. In one example, the first transaction data comprises at least enterprise server account ID, the enterprise server subaccount ID, aggregation start time, aggregation end time, hash of message hash values, count of messages, and a plurality of transaction IDs of the aggregated messages and respective time stamp of the plurality of transaction IDs. The ordering service module 230 invokes chain code 320-1 of the enterprise sever peer node 232 to write the first transaction data by storing a copy of the first transaction data in the distributed ledger 232-1.

The communication unit 108 further enables queuing of the A2P messages in the message queues 114 from wherein the telecom node 301-1 of the assigned telecom operator pulls the A2P message. In one embodiment, the routing engine 144 of the communication unit 108 determines at least one telecom node 301-1 for routing the A2P messages for final delivery to the end user 120-1 and pushes the A2P messages to the first set of queues of the telecom node 301-1 determined for transmission to the appropriate assigned telecom server 301-2 as part of second transaction at step 312. In one example, the assigned telecom server 301-2 may be identified using metadata. In another embodiment, the routing engine 144 may push the encrypted A2P messages to the first set of queues of the telecom node 301-1. The communication unit 108 then enables recording of the second transaction having the transaction ID 148 into the DDS 116 at step 314.

As illustrated in FIG. 3b, the transaction recorder module 146 of the communication unit 108 enables recording of the second transaction on the DDS 116. The message grouping unit 266 is configured to aggregate the plurality of messages received for a predetermined time period based on predefined criteria so as to generate a set of aggregated messages. In another embodiment, the message grouping unit 266 may aggregate the set of encrypted A2P messages before recording on the distributed ledger based on the predefined criteria. In one example, the predefined criteria include one or more of enterprise server account ID, enterprise server subaccount ID, aggregation time period, count of messages, enterprise aggregator ID and enterprise sub-aggregator ID. The certifier 268 verifies the set of aggregated messages and signs the second transaction for recording on the distributed ledger. The DLT proxy node 270 enables recording of the second transaction on the DDS 116. In one embodiment, the ordering service module 230 of the DDS 116 is configured to execute the recording of the second transaction by the communication unit peer node 272. The DLT proxy node 270 transmits a second transaction data to the ordering service module 230 for committing the second transaction on the distributed ledger 272-1. In one example, the second transaction data comprises at least enterprise server account ID, the enterprise server subaccount ID, aggregation start time, aggregation end time, hash of message hash values, count of messages, enterprise aggregator ID, telecom server ID, and a plurality of transaction IDs of the aggregated messages and respective time stamp of the plurality of transaction IDs. The ordering service module 230 invokes chain code 320-2 and enables the communication unit peer node 272 to write the second transaction data by storing a copy of the second transaction data in the distributed ledger 272-1.

The telecom node 301-1 retrieves the A2P messages from another set of queues pushed by the communication unit 108 and forwards the retrieved A2P messages to the assigned telecom server 301-2 at step 316. In one embodiment, the telecom node 301-1 comprises a queue reader configured to pull the A2P messages from the message queues 114 and process the messages for delivery to the telecom server 301-2. In one embodiment, the SMPP client module 282 of the second node 112 i.e., the telecom node 301-1 process the retrieved A2P messages into a suitable format for transmission to the telecom server 301-2 using SMPP protocol as a part of third transaction. In another embodiment, the telecom node 301-1 may decrypt the A2P message before transmitting to the end user 120-1 as part of the third transaction. The telecom node 301-1 further enables writing of the third transaction having the transaction ID 156 into the DDS 116 at step 318.

As illustrated in FIG. 3b, the transaction recorder module 154 of the telecom node 301-1 enables writing of the third transaction on the DDS 116. The message grouping unit 292 is configured to aggregate the plurality of messages received for a predetermined time period based on predefined criteria so as to generate a set of aggregated messages. In another embodiment, the message grouping unit 292 may aggregate the set of decrypted A2P messages before recording on the distributed ledger based on the predefined criteria In one example, the predefined criteria include one or more of at least enterprise server account ID, enterprise server subaccount ID, aggregation time period, count of messages, enterprise aggregator ID, enterprise sub-aggregator ID and telecom server ID. The certifier 294 verifies the set of aggregated messages and signs the third transaction for recording on the distributed ledger. The DLT proxy node 296 enables recording of the third transaction on the DDS 116. In one embodiment, the ordering service module 230 of the DDS 116 is configured to execute the recording of the third transaction by the telecom server peer node 298. The DLT proxy node 296 transmits a third transaction data to the ordering service module 230 for committing the third transaction on the distributed ledger 298-1. In one example, the third transaction data comprises at least at least enterprise server account ID, the enterprise server subaccount ID, aggregation start time, aggregation end time, hash of message hash values, count of messages, enterprise aggregator ID, telecom server ID, and a plurality of transaction IDs of the aggregated messages and respective time stamp of the plurality of transaction IDs. The ordering service module 230 invokes chain code 320-3 and enables the telecom server peer node 298 to write the third transaction data by storing a copy of the third transaction data in the distributed ledger 298-1. Once the message is successfully delivered to the assigned telecom server 301-2, the telecom server 301-2 transmits the A2P messages to the end users 120-1 at step 320, thus enabling auditable transmission of A2P messages from an enterprise server to end users using the secure messaging platform 106.

Figure 3C:
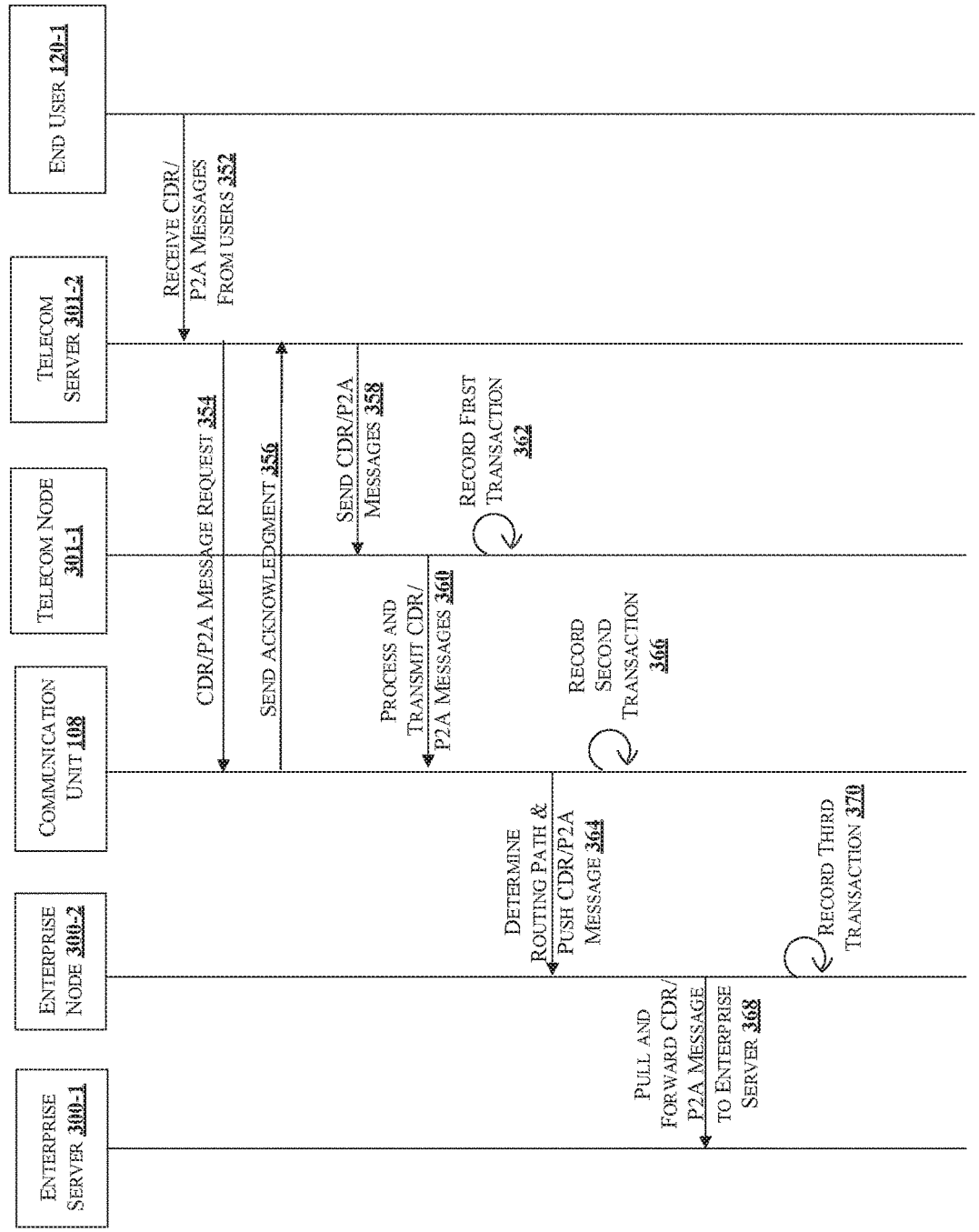
FIG. 3c is a simplified flow diagram of an embodiment of the messaging platform for Peer to Application (P2A)/Call data record (CDR) messaging from a telecom server to an enterprise server in accordance with some embodiment of the present disclosure.

In response to the delivery of A2P message to the end users 120-1, a Call data record (CDR) is transmitted from the end user 120-1 to the telecom server 301-2 at step 352 as best illustrated in FIG. 3c. CDR messages for example, may comprise message status such as message delivered, not delivered with error of out of coverage, switched off etc. In another embodiment, the CDR messages may be encrypted by the telecom node 301-1 before transmitting to the communication unit 108 and decrypted by the enterprise node 300-2. In another embodiment, the end user 120-1 may wish to transmit Person to Application (P2A) messages that are originated by the one or more user devices of the end user 120-1 and intended to transmit to the enterprise server 300-1 for seeking a suitable response from the enterprise server 300-1. In such example, the P2A messages may be encrypted by the telecom node 301-1 before transmitting to the communication unit 108 and decrypted by the enterprise node 300-2.

The telecom server 301-2 comprises one or more telecom applications to invoke one or more APIs using SMPP protocol to initiate a CDR or P2A message request to the communication unit 108 at step 354. The telecom server 301-2 receives an acknowledgement from the communication unit 108 for servicing the P2A/CDR message request at step 356. The telecom server 301-2 transmits the P2A/CDR messages comprising message content along with the metadata to the telecom node 301-1 at step 358. The message processor 132 of the second node 112 i.e., the telecom node 301-1 receives and processes the received message content to a suitable format for transmission to the communication unit 108. In one embodiment, the telecom node 301-1 processes the message content into a suitable format and transmits the P2A/CDR message via SMPP protocol as a part of first transaction at step 360. Further, the telecom node 301-1 writes the first transaction into the DDS 116 at step 362. As illustrated in FIG. 3b, the transaction recorder module 154 of the telecom node 301-1 writes the first transaction on the DDS 116. The ordering service module 230 invokes chain code 320-3 and enables the telecom server peer node 298 to write first transaction data by storing a copy of the first transaction data in the distributed ledger 298-1.

The communication unit 108 further enables queuing of the P2A/CDR messages in the message queues 114 from wherein the enterprise node 300-2 of the assigned enterprise server pulls the P2A/CDR message. In one embodiment, the routing engine 144 of the communication unit 108 determines third parties and at least one enterprise node 300-2 for routing the P2A/CDR messages for final delivery to the enterprise server 300-1 and pushes the P2A/CDR messages to the enterprise node 300-2 determined for transmission to the appropriate assigned enterprise server 300-1 as part of second transaction at step 364. In one example, the assigned enterprise server 300-1 may be identified using metadata. The communication unit 108 then writes the second transaction into the DDS 116 at step 366. As illustrated in FIG. 3b, the transaction recorder module 146 of the communication unit 108 writes the second transaction on the DDS 116. The ordering service module 230 invokes chain code 320-2 and enables writing of the second transaction data to the communication unit peer node 272 storing a copy of the second transaction data in the distributed ledger 272-1.

The enterprise node 300-2 retrieves or pulls the P2A/CDR messages from the queues as pushed by the communication unit 108 and forwards the retrieved P2A/CDR messages to the assigned enterprise server 300-1 at step 368. In one embodiment, the enterprise node 300-2 comprises a queue reader configured to pull the P2A/CDR messages from the queues of the enterprise node 300-2 and process the messages for delivery to the enterprise server 300-1. In one embodiment, the HTTP/SMPP server module 202 of the first node 110 i.e., the enterprise node 300-2 process the retrieved P2A/CDR messages into a suitable format for transmission to the enterprise server 300-1 using HTTP/SMPP protocol as a part of third transaction. The enterprise node 300-2 writes the third transaction into the DDS 116 at step 370. As illustrated in FIG. 3b, the transaction recorder module 134 of the enterprise node 300-2 writes the third transaction on the DDS 116. The ordering service module 230 invokes chain code 320-1 and enables the enterprise server peer node 232 to write the third transaction data by storing a copy of the third transaction data in the distributed ledger 232-1. Thus, enabling the enterprises with transparency on CDR messages by auditable transmission of P2A/CDR messages from end users to an enterprise server using the secure messaging platform 106.

Figure 3D:
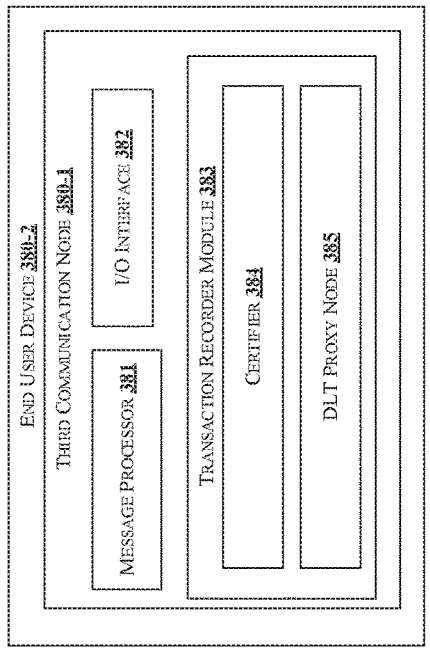
FIG. 3d is a simplified schematic diagram illustrating an exemplary block diagram of a third communication node in accordance with some embodiments of the present disclosure.

In yet another embodiment, as illustrated in FIG. 3d, the messaging platform 106 comprises a third communication node (alternatively referred to as end user device node 380-1). As illustrated, the end user device node 380-1 comprises at least a message processor 381, I/O interface 382 and a transaction recorder module 383 that comprises at least a certifier 384 and a DLT proxy node 385. The I/O interface 382 is configured to receive one or more A2P messages from the telecom server 301-2. The message processor 381 generates CDR message for each A2P message received and enables the transaction recorder module 383 to record the CDR message on the distributed ledger. In one embodiment, the certifier 384 verifies the generated CDR message and signs the certified CDR message for recording on the distributed ledger. The DLT proxy node 385 enables the recording of the CDR message on the DDS 116.

Figure 3E:
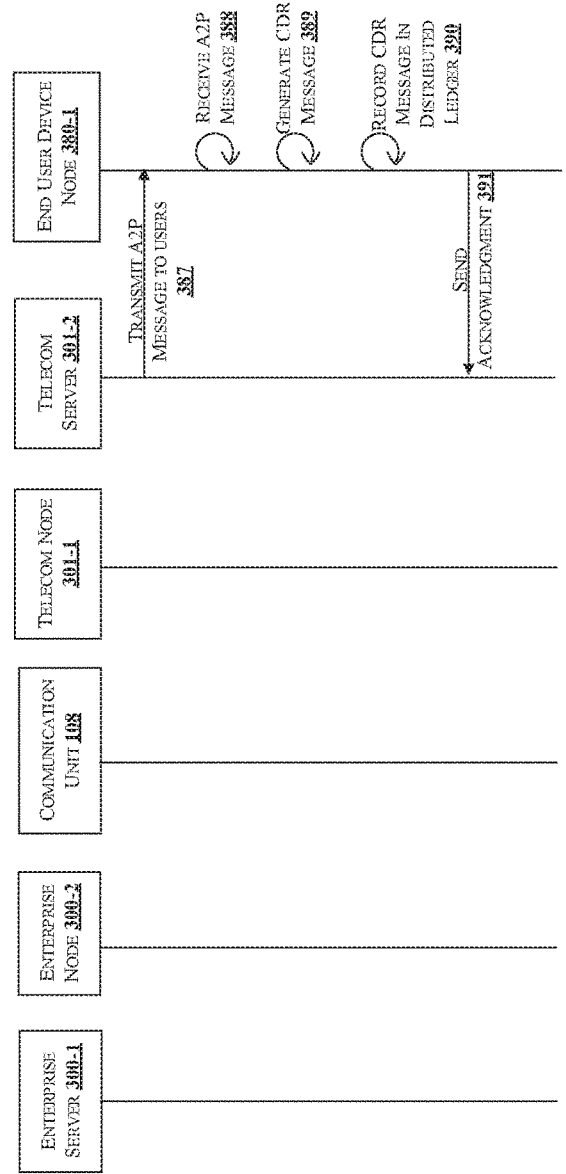
FIG. 3e is a simplified flow diagram of an embodiment of the messaging platform for CDR messaging from a user device in accordance with some embodiment of the present disclosure.

FIG. 3e illustrates flow diagram of CDR recordation by the end user device 380-2. As illustrated, the telecom server 301-2 forwards the A2P message to the end user device node 380-1 at step 387. The end user device node 380-1 receives the one or more A2P messages from the telecom server 301-2 at step 388 and generates CDR message for each A2P message received at step 389. The end user device node 380-1 further records the CDR message generated for each received A2P message on the distributed ledger of the distributed database 116 at step 390 and transmits an acknowledgement to the telecom server 301-2 indicating the message status at step 391. By way of enabling the recording of the CDR messages by the user devices in the distributed ledger, the messaging platform 106 would prevent generation of fake CDR messages by any intermediate parties thereby providing more accurate CDR reconciliation by the enterprise server 300-1

Figure 4:
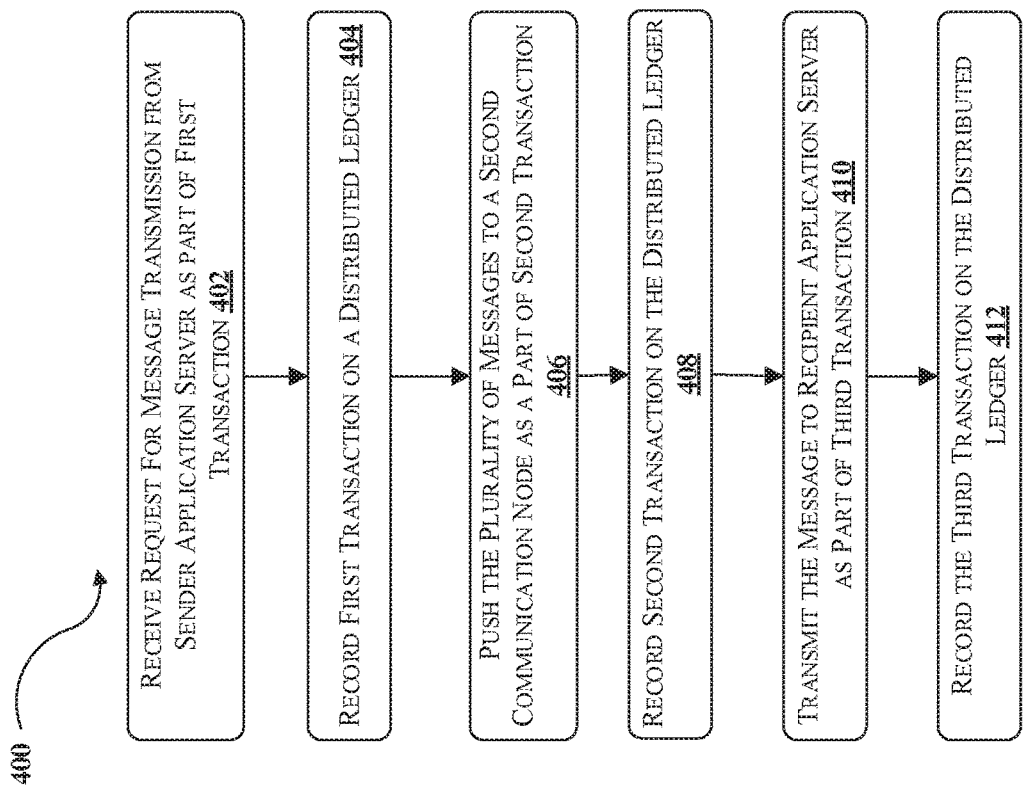
FIG. 4 is a simplified schematic diagram illustrating an exemplary flowchart for some embodiments of the present disclosure.

FIG. 4 is a simplified flowchart illustrating auditable transmission of A2P/P2ACDR messages by a messaging platform in accordance with some embodiments of the present disclosure.

As illustrated in FIG. 4, the method 400 comprises one or more blocks implemented by the messaging platform 106 for enabling auditable transmission of A2P messages from a sender server to end users via a recipient server and auditable transmission of P2A/CDR messages from end users to sender server. The method 400 may be described in the general context of computer executable instructions. Generally, computer executable instructions can include routines, programs, objects, components, data structures, procedures, modules, and functions, which perform particular functions or implement particular abstract data types.

The order in which the method 400 is described is not intended to be construed as a limitation, and any number of the described method blocks can be combined in any order to implement the method 400. Additionally, individual blocks may be deleted from the method 400 without departing from the scope of the subject matter described herein. Furthermore, the method 400 can be implemented in any suitable hardware, software, firmware, or combination thereof.

At block 402, receive a request for message transmission from sender application server as part of first transaction. In one embodiment, the enterprise server 300-1 initiates an A2P message request comprising A2P messages and transmits to the communication unit 108 as part of first transaction. In another embodiment, the telecom server 301-2 initiates a P2A/CDR message request comprising P2A/CDR messages and transmits to the communication unit 108 as part of first transaction.

At block 404, record first transaction on a distributed ledger. In an embodiment, the enterprise node 300-2 records the transmission of A2P messages in the distributed ledger using the transaction recorder module of the enterprise node 300-2. In another embodiment, the telecom node 301-1 records the transmission of P2A/CDR messages in the distributed ledger using the transaction recorder module of the telecom node 301-1.

At block 406, push the plurality of messages to a second node as a part of second transaction. In one embodiment, the communication unit 108 enables queuing of the A2P messages in the message queues 114 as part of second transaction from wherein the telecom node 301-1 of the assigned telecom operator pulls the A2P message. In another embodiment, the communication unit 108 enables queuing of the P2A/CDR messages in the message queues 114 as part of second transaction from wherein the enterprise node 300-2 of the assigned enterprise server pulls the P2A/CDR message.

At block 408, record second transaction on the distributed ledger. In one embodiment, the communication unit 108 records the second transaction on the distributed ledger, wherein the second transaction may be, in one embodiment, queuing of the A2P messages in the queues of the telecom node 301-1, and in another embodiment the second transaction may be queuing of the P2A/CDR messages in the queues of the enterprise node 300-2.

At block 410, transmit the message to recipient application server as part of third transaction. In one embodiment, the telecom node 301-1 retrieves the A2P messages from the queues pushed by the communication unit 108 and forwards the retrieved A2P messages to the assigned telecom server 301-2 as part of third transaction. In another embodiment, the enterprise node 300-2 retrieves or pulls the P2A/CDR messages from the queues as pushed by the communication unit 108 and forwards the retrieved P2A/CDR messages to the assigned enterprise server 300-1 as part of third transaction.

At block 412, record the third transaction on the distributed ledger. In an embodiment, the telecom node 301-1 records the retrieval of the A2P messages as the third transaction on the DDS 116. In another embodiment, the enterprise node 300-2 records the retrieval of P2A/CDR messages as the third transaction on the DDS 116.

Once the A2P message is successfully delivered to the assigned telecom server 301-2, the telecom server 301-2 transmits the A2P messages to the end users 120-1, thus enabling the enterprise server 300-1 with traceability or visibility of transmission of A2P messages by the telecom server 301-2 to the end users 120-1. In another embodiment, the P2A/CDR message is successfully delivered to the assigned enterprise server 300-1 for further operations such as CDR reconciliation, thus enabling transparency on auditable transmission of P2A/CDR messages and preventing generation of fake CDRs for the enterprise server 300-1.

Furthermore, as every recorded transaction is stored in the distributed database system, such as blockchain ledgers that are immutable, the messaging platform also avoids manipulation of CDRs and timestamp and/or route information by third parties, thereby enabling transparency and visibility to the sender application server on the messages delivered, route followed, time stamp and CDRs received. As the messaging platform do not involve any third parties for message delivery, the delay caused by the transmission of messages by third parties is also avoided, thereby improving the throughput of the message transmission and increased customer reach by the enterprises.

Figure 5:
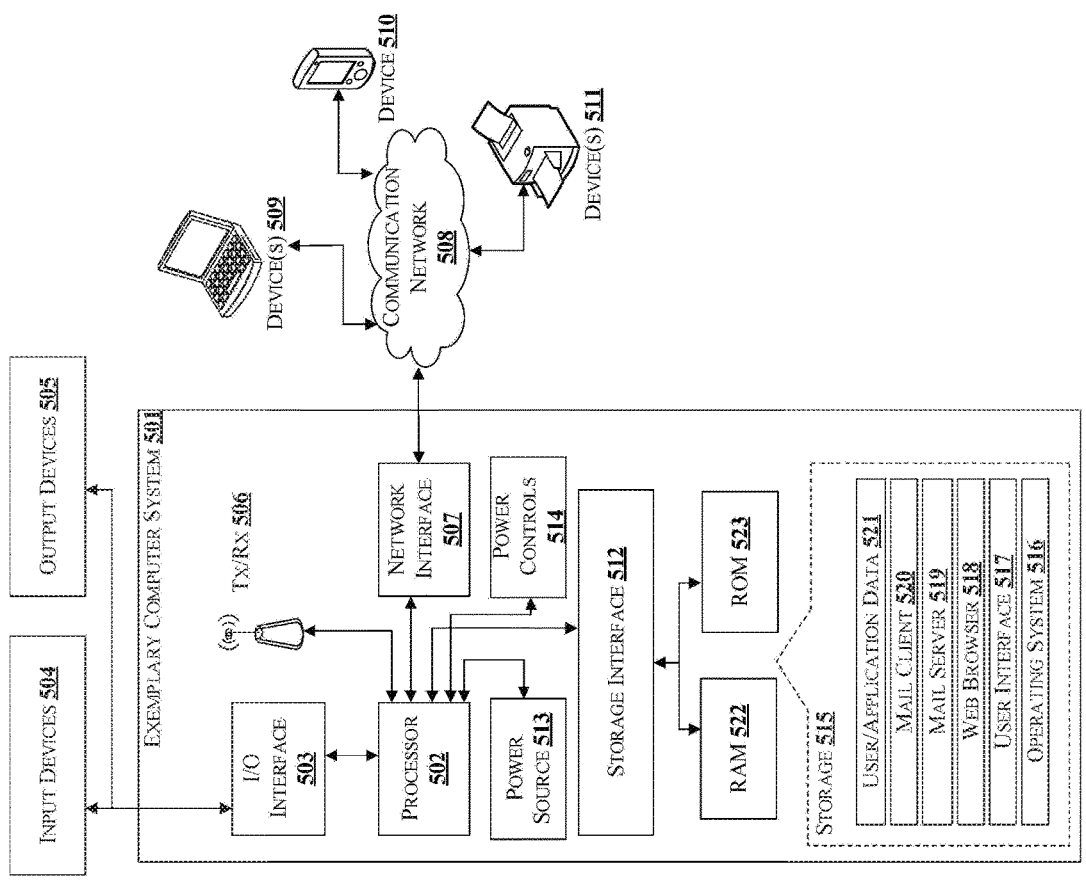
FIG. 5 is a simplified schematic diagram illustrating an exemplary block diagram of a computer system for implementing embodiments consistent with the present disclosure.

FIG. 5 illustrates a block diagram of an exemplary computer system for implementing embodiments consistent with the present disclosure.

In an embodiment, the computer system 501 may be communication unit 108, which is used for pushing the plurality of messages from the first node 110 to the second node 112. The computer system 501 may include a central processing unit ("CPU" or "processor") 502. The processor 502 may comprise at least one data processor for executing program components for executing user or system-generated business processes. The processor 502 may include specialized processing units such as integrated system (bus) controllers, memory management control units, floating point units, graphics processing units, digital signal processing units, etc.

The processor 502 may be disposed in communication with one or more input/output (I/O) devices (504 and 505) via I/O interface 503. The I/O interface 503 may employ communication protocols/methods such as, without limitation, audio, analog, digital, stereo, IEEE-1394, serial bus, Universal Serial Bus (USB), infrared, PS/2, BNC, coaxial, component, composite, Digital Visual Interface (DVI), high-definition multimedia interface (HDMI), Radio Frequency (RF) antennas, S-Video, Video Graphics Array (VGA), IEEE 802.n/b/g/n/x, Bluetooth, cellular (e.g., Code-Division Multiple Access (CDMA), High-Speed Packet Access (HSPA+), Global System For Mobile Communications (GSM), Long-Term Evolution (LTE) or the like), etc.

Using the I/O interface 503, the computer system 501 may communicate with one or more I/O devices (504 and 505). In some implementations, the processor 502 may be disposed in communication with a communication network 508 via a network interface 507. The network interface 507 may employ connection protocols including, without limitation, direct connect, Ethernet (e.g., twisted pair 10/100/1000 Base T), Transmission Control Protocol/Internet Protocol (TCP/IP), token ring, IEEE 802.11a/b/g/n/x, etc. Using the network interface 507 and the communication network 508, the computer system 501 may be connected to the sender server 102 and the recipient server 104.

The communication network 508 can be implemented as one of the several types of networks, such as intranet or any such wireless network interfaces. The communication network 508 may either be a dedicated network or a shared network, which represents an association of several types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the communication network 508 may include a variety of network devices, including routers, bridges, servers, computing devices, storage devices, etc.

In some embodiments, the processor 502 may be disposed in communication with a memory 515 e.g., RAM 522, and ROM 523, etc. as shown in FIG. 5, via a storage interface 512. The storage interface 512 may connect to memory 515 including, without limitation, memory drives, removable disc drives, etc., employing connection protocols such as Serial Advanced Technology Attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 515 may store a collection of program or database components, including, without limitation, user/application 521, an operating system 516, a web browser 518, a mail client 520, a mail server 519, a user interface 517, and the like. In some embodiments, computer system 501 may store user/application data 521, such as the data, variables, records, etc. as described in this invention. Such databases may be implemented as fault-tolerant, relational, scalable, secure databases such as Oracle or Sybase.

The operating system 516 may facilitate resource management and operation of the computer system 501. Examples of operating systems include, without limitation, Apple Macintosh™ OS X™, UNIX™, Unix-like system distributions (e.g., Berkeley Software Distribution (BSD), FreeBSD™, Net BSD™, Open BSD™, etc.), Linux distributions (e.g., Red Hat™, Ubuntu™, K-Ubuntu™, etc.), International Business Machines (IBM™) OS/2™, Microsoft Windows™ (XP™ Vista/7/8, etc.), Apple iOS™, Google Android™, Blackberry™ Operating System (OS), or the like. A user interface may facilitate display, execution, interaction, manipulation, or operation of program components through textual or graphical facilities. For example, user interfaces may provide computer interaction interface elements on a display system operatively connected to the computer system 501, such as cursors, icons, check boxes, menus, windows, widgets, etc. Graphical User Interfaces (GUIs) may be employed, including, without limitation, Apple™ Macintosh™ operating systems' Aqua™, IBM™ OS/2™, Microsoft™ Windows™ (e.g., Aero, Metro, etc.), Unix X-Windows™, web interface libraries (e.g., ActiveX, Java, JavaScript, AJAX, HTML, Adobe Flash, etc.), or the like.

As described above, the modules, amongst other things, include routines, programs, objects, components, and data structures, which perform particular tasks or implement particular abstract data types. The modules may also be implemented as, signal processor(s), state machine(s), logic circuitries, and/or any other device or component that manipulate signals based on operational instructions. Further, the modules can be implemented by one or more hardware components, by computer-readable instructions executed by a processing unit, or by a combination thereof.

Furthermore, one or more computer-readable storage media may be utilized in implementing some of the embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor (s) to perform steps or stages consistent with the embodiments described herein. The term "computer-readable medium" should be understood to include tangible items and exclude carrier waves and transient signals, i.e., non-transitory. Examples include Random Access Memory (RAM), Read-Only Memory (ROM), volatile memory, non-volatile memory, hard drives, Compact Disc (CD) ROMs, Digital Video Disc (DVDs), flash drives, disks, and any other known physical storage media.

The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

It is intended that the disclosure and examples be considered as exemplary only, with a true scope of disclosed embodiments being indicated by the following claims.

What is claimed is:

1. A messaging platform for auditable transmission of a plurality of messages from at least a sender application server to at least a recipient application server, comprising:
   a distributed ledger;
   at least a first communication node hosted at the sender application server, configured to receive the plurality of messages from the sender application server as a part of first transaction and record the first transaction on the distributed ledger;
   a communication unit coupled with the first communication node, configured to push the plurality of messages to at least a second communication node as a part of second transaction and record the second transaction on the distributed ledger; and
   the at least one second communication node coupled with the communication unit and hosted at the recipient application server, configured to transmit the plurality of messages to the recipient application server as a part of third transaction and record the third transaction on the distributed ledger,
   wherein the plurality of messages remains the same in each of the first, the second and the third transactions;
   wherein each message is one of an Application-to-person (A2P) message, a call data record (CDR) message generated in response to receipt of A2P message and a Person-to-Application (P2A) message generated by one or more user devices of the end users; and
   wherein if the message is the A2P message, the sender application server is an enterprise server and the one or more recipient application server is one or more telecom servers, and if the message is the CDR/P2A message, the sender server is a telecom server and the one or more recipient application server is one or more enterprise servers.

2. The platform as claimed in claim 1, wherein the first communication node is configured to record the first transaction by:
   aggregating the plurality of messages to generate a set of aggregated messages based on criteria comprising at least sender application server account ID, sender application server subaccount ID, aggregation time period, and count of messages; and
   recording the first transaction by writing a first transaction data on the distributed ledger, wherein the first transaction data comprises at least sender application server account ID, the sender application server subaccount ID, aggregation start time, aggregation end time, hash of message hash values, count of messages, and a plurality of transaction IDs of the aggregated messages and respective time stamp of the plurality of transaction IDs.

3. The platform as claimed in claim 1, wherein the communication unit comprises at least a processor, I/O interface, routing engine and a transaction recorder module, wherein the transaction recorder module comprises at least a message grouping unit and Distributed Ledger Technology (DLT) proxy node.

4. The platform as claimed in claim 1, wherein the communication unit is configured to record the second transaction by:
   aggregating the plurality of messages to generate a set of aggregated messages based on criteria comprising at least sender application server account ID, sender application server subaccount ID, aggregation time period, count of messages, sender aggregator ID and sender sub-aggregator ID; and recording the second transaction by writing a second transaction data on the distributed ledger, wherein the second transaction data comprises at least sender application server account ID, the sender application server subaccount ID, aggregation start time, aggregation end time, hash of message hash values, count of messages, sender aggregator ID, recipient application server ID, and a plurality of transaction IDs of the aggregated messages and respective time stamp of the plurality of transaction IDs.

5. The platform as claimed in claim 1, wherein the second communication node is configured to record the third transaction by:

aggregating the plurality of messages to generate a set of aggregated messages based on criteria comprising at least sender application server account ID, sender application server subaccount ID, aggregation time period, count of messages, sender aggregator ID, sender sub-aggregator ID and recipient application server ID; and recording the third transaction by writing a third transaction data on the distributed ledger, wherein the third transaction data comprises at least sender application server account ID, the sender application server subaccount ID, aggregation start time, aggregation end time, hash of message hash values, count of messages, sender aggregator ID, recipient application server ID, and a plurality of transaction IDs of the aggregated messages and respective time stamp of the plurality of transaction IDs.

6. The platform as claimed in claim 1, wherein the A2P message is one of Short Message Service (SMS), Rich Communication Service (RCS), and Multimedia Messaging Service (MMS).

7. The platform as claimed in claim 1, wherein the messaging platform further comprises a third communication node configured to enable the one or more user devices to record the CDR message generated for each received A2P message on the distributed ledger.

8. The platform as claimed in claim 1 or 7, wherein each of the first, second and third communication node comprises at least a message processor, I/O interface, and a transaction recorder module, wherein the transaction recorder module comprises at least a message grouping unit and Distributed Ledger Technology (DLT) proxy node.

9. A method of auditable transmission of a plurality of messages from at least a sender application server to at least a recipient application server, comprising:

receiving a plurality of messages from the sender application server as a part of first transaction;
recording the first transaction on a distributed ledger;
pushing the received plurality of messages onto the recipient application server as a part of second transaction;
recording the second transaction on the distributed ledger; and
transmitting the plurality of messages to the recipient application server as a part of third transaction; and
recording the third transaction on the distributed ledger, wherein the plurality of messages remains the same in each of the first, the second and the third transactions;
wherein each message is one of an Application-to-person (A2P) message, a call data record (CDR) message generated in response to receipt of A2P message and a Person-to-Application (P2A) message generated by one or more user devices of the end users; and
wherein if the message is the A2P message, the sender server is an enterprise server and the one or more recipient application server is one or more telecom servers, and if the message is the CDR message, the sender server is a telecom server and the one or more recipient application server is one or more enterprise servers.

10. The method as claimed in claim 9, wherein recording the first transaction comprises steps of:

aggregating the plurality of messages to generate a set of aggregated messages based on criteria comprising at least sender application server account ID, sender application server subaccount ID, aggregation time period, and count of messages; and recording the first transaction by writing a first transaction data on the distributed ledger, wherein the first transaction data comprises at least sender application server account ID, the sender application server subaccount ID, aggregation start time, aggregation end time, hash of message hash values, count of messages, and a plurality of transaction IDs of the aggregated messages and respective time stamp of the plurality of transaction IDs.

11. The method as claimed in claim 9, wherein recording the second transaction comprises steps of:

aggregating the plurality of messages to generate a set of aggregated messages based on criteria comprising at least sender application server account ID, sender application server subaccount ID, aggregation time period, count of messages, sender aggregator ID and sender sub-aggregator ID; and recording the second transaction by writing a second transaction data on the distributed ledger, wherein the second transaction data comprises at least sender application server account ID, the sender application server subaccount ID, aggregation start time, aggregation end time, hash of message hash values, count of messages, sender aggregator ID, recipient application server ID, and a plurality of transaction IDs of the aggregated messages and respective time stamp of the plurality of transaction IDs.

12. The method as claimed in claim 9, wherein recording the third transaction comprises steps of:

aggregating the plurality of messages to generate a set of aggregated messages based on criteria comprising at least sender application server account ID, sender application server subaccount ID, aggregation time period, count of messages, sender aggregator ID, sender sub-aggregator ID and recipient application server ID; and recording the third transaction by writing a third transaction data on the distributed ledger, wherein the third transaction data comprises at least sender application server account ID, the sender application server subaccount ID, aggregation start time, aggregation end time, hash of message hash values, count of messages, sender aggregator ID, recipient application server ID, and a plurality of transaction IDs of the aggregated messages and respective time stamp of the plurality of transaction IDs.

13. The method as claimed in claim 9, wherein the A2P message is one of Short Message Service (SMS), Rich Communication Service (RCS), and Multimedia Messaging Service (MMS).

14. The method as claimed in claim 9, further comprising enabling the one or more user devices to record the CDR message generated for each received A2P message on the distributed ledger.

15. An article of manufacture including a non-transitory, tangible computer readable storage medium having instructions stored thereon, that in response to execution by a messaging platform, cause the messaging platform to perform operations comprising:
  receiving a plurality of messages from a sender application server as a part of first transaction;
  recording the first transaction on a distributed ledger;
  pushing the received plurality of messages onto a recipient application server as a part of second transaction;
  recording the second transaction on the distributed ledger; and
  transmitting the plurality of messages to the recipient application server as a part of third transaction; and
  recording the third transaction on the distributed ledger,
  wherein the plurality of messages remains the same in each of the first, the second and the third transactions;
  wherein each message is one of Application-to-person (A2P) message, call data record (CDR) message generated in response to receipt of A2P message and Person-to-Application (P2A) message generated by one or more user devices of the end users; and
  wherein if the message is the A2P message, the sender server is an enterprise server and the one or more recipient application server is one or more telecom servers, and if the message is the CDR message, the sender server is a telecom server and the one or more recipient application server is one or more enterprise servers.

16. The article of manufacture as claimed in claim 15, wherein recording the first transaction comprises operations of:
  aggregating the plurality of messages to generate a set of aggregated messages based on criteria comprising at least sender application server account ID, sender application server subaccount ID, aggregation time period, and count of messages; and
  recording the first transaction by writing a first transaction data on the distributed ledger, wherein the first transaction data comprises at least sender application server account ID, the sender application server subaccount ID, aggregation start time, aggregation end time, hash of message hash values, count of messages, and a plurality of transaction IDs of the aggregated messages and respective time stamp of the plurality of transaction IDs.

17. The article of manufacture as claimed in claim 15, wherein recording the second transaction comprises operations of:
  aggregating the plurality of messages to generate a set of aggregated messages based on criteria comprising at least sender application server account ID, sender application server subaccount ID, aggregation time period, count of messages, sender aggregator ID and sender sub-aggregator ID; and
  recording the second transaction by writing a second transaction data on the distributed ledger, wherein the second transaction data comprises at least sender application server account ID, the sender application server subaccount ID, aggregation start time, aggregation end time, hash of message hash values, count of messages, sender aggregator ID, recipient application server ID, and a plurality of transaction IDs of the aggregated messages and respective time stamp of the plurality of transaction IDs.

18. The article of manufacture as claimed in claim 15, wherein recording the third transaction comprises operations of:
  aggregating the plurality of messages to generate a set of aggregated messages based on criteria comprising at least sender application server account ID, sender application server subaccount ID, aggregation time period, count of messages, sender aggregator ID, sender sub-aggregator ID and recipient application server ID; and
  recording the third transaction by writing a third transaction data on the distributed ledger, wherein the third transaction data comprises at least sender application server account ID, the sender application server subaccount ID, aggregation start time, aggregation end time, hash of message hash values, count of messages, sender aggregator ID, recipient application server ID, and a plurality of transaction IDs of the aggregated messages and respective time stamp of the plurality of transaction IDs.

19. The article of manufacture as claimed in claim 15, wherein the A2P message is one of Short Message Service (SMS), Rich Communication Service (RCS), and Multimedia Messaging Service (MMS).

20. The article of manufacture as claimed in claim 15, further comprises operations for enabling the one or more user devices to record the CDR message generated for each received A2P message on the distributed ledger.

* * * * *